Nov. 12, 1957 P. E. HUMPHREY 2,812,647
FLEXIBLE COUPLING FOR ROTARY SHAFT
Filed Jan. 14, 1957 2 Sheets-Sheet 1

INVENTOR.
PAUL E. HUMPHREY
BY
Knox & Knox

Nov. 12, 1957 P. E. HUMPHREY 2,812,647
FLEXIBLE COUPLING FOR ROTARY SHAFT
Filed Jan. 14, 1957 2 Sheets-Sheet 2

INVENTOR.
PAUL E. HUMPHREY
BY
Knox & Knox

United States Patent Office 2,812,647
Patented Nov. 12, 1957

2,812,647
FLEXIBLE COUPLING FOR ROTARY SHAFT
Paul E. Humphrey, San Diego, Calif.
Application January 14, 1957, Serial No. 633,975
3 Claims. (Cl. 64—10)

The present invention relates generally to coupling devices and more particularly to means for coupling rotary drive and driven members where, to the greatest extent possible, the driven member must be subject to pure torque.

The primary object of this invention is to provide a coupling device which readily adjusts itself to conditions wherein the coupled members may be in considerable misalignment of radial or angular character.

A further object of this invention is to provide a coupling for shafts which will permit considerable relative movement of the shafts in a generally axial direction.

Another object of this invention is to provide a coupling which, in operative arrangement with shafts which have functional misalignment, imposes a minimum of undesirable restraint in such functional misalignment shafts, so that in a gyroscopic device, for example, the tilting of the gimbal will be reflected by a truly proportional response to the rate input.

A further object of this invention is to provide flexible connecting means for shaft members, wherein uncoupling is effected solely by withdrawal of one shaft member from the other.

A still further object of this invention is to provide a coupling exhibiting marked superiority in the elastic absorption of vibrations, so that torque is delivered without transmission of these vibrations.

Finally, it is an object to provide a rotary shaft coupling which is economical and simple to manufacture and which will give generally efficient and durable service.

With these objects definitely in view, along with other objects which will appear hereinafter as this description proceeds, this invention consists in the novel construction, combination and arrangement of elements and portions, as will be hereinafter fully described in the specification, particularly pointed out in the appended claims, and illustrated in the drawings which form a material part of this disclosure, and in which:

Similar characters of reference are used to indicate similar or identical elements and portions throughout the specification and throughout the drawings.

Figure 1:
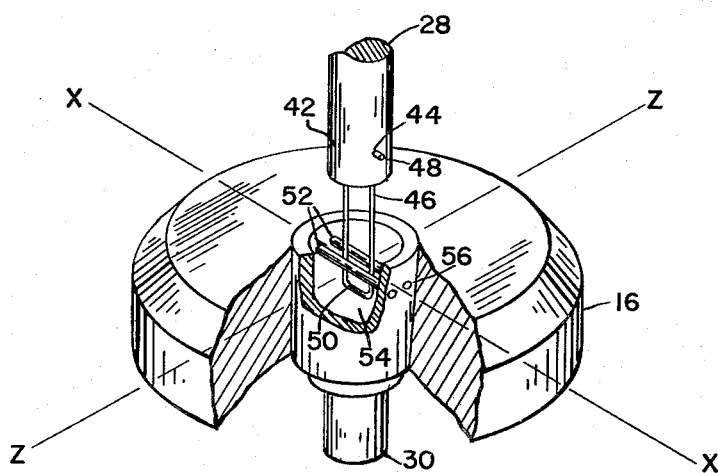
Figure 1 is a fragmentary, isometric view of the invention as operatively combined with a gyroscopic wheel.

The primary field of use of the present invention and one wherein the advantages of the invention are fully reflected, is in the device such as the rate gyroscope fragmentarily indicated in the drawings and generally designated by the numeral 10. In the gyroscopic device illustrated, a motor 12 is mounted on the instrument frame 14 and this motor drives the gyroscopic wheel 16. The gyroscopic wheel is mounted on ball bearings 18, 20 which may be pressed into a gimbal frame 22. The gimbal frame is mounted in the frame 14 for oscillation about an axis through the centers of the spring flexure pivots 24, 26. The said motor 12 is provided with a drive shaft 28 and the gyroscopic wheel is provided with a shaft 30.

Figure 2:
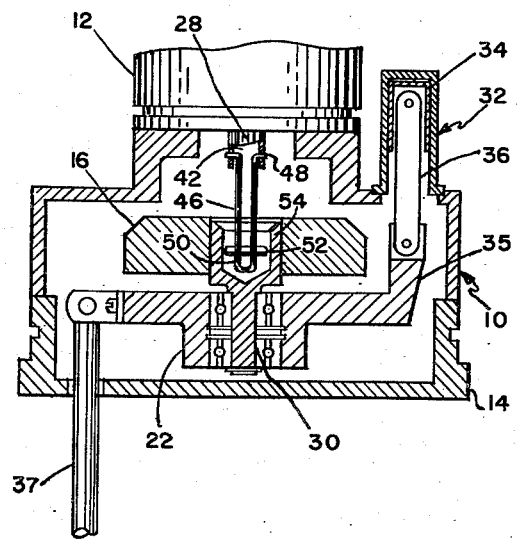
Figure 2 is a vertical sectional view and may be considered as taken on the X—X axis indicated in Figure 1.
Figure 3:
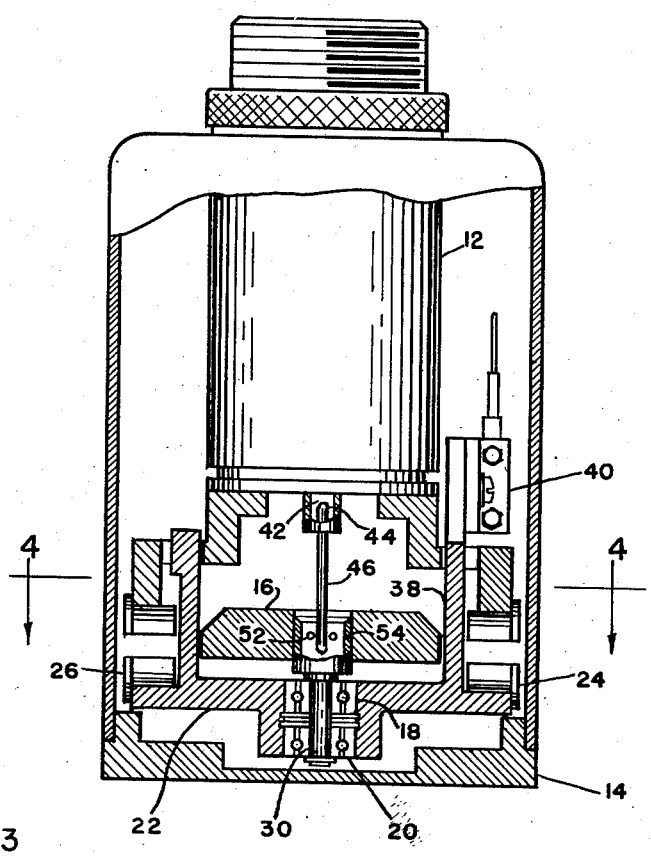
Figure 3 is a vertical sectional view on the axis Z—Z, indicated in Figure 1.
Figure 4:
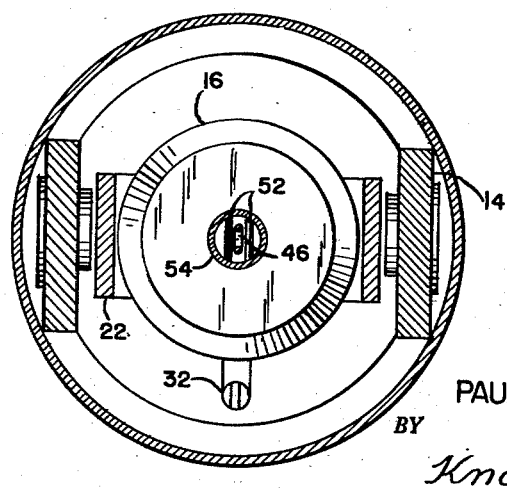
Figure 4 is a sectional view taken on the section line 4—4 in Figure 3.

It will be understood that tilting of the instrument frame 14 will result in changes in the relative aspects of the frame 14 and the gyroscopic wheel 16, and the motor 12 is fixed in frame 14, this tilting will be reflected by corresponding changes in the relative aspects of the drive shaft 28 and the gyroscopic wheel. These changes are made against a predetermined restraint of the spring flexure pivots 24 and 26 and these changes are also dampened by the action of a dash pot means generally indicated at 32 in Figure 2. The particular structure of this dash pot means is somewhat immaterial to this disclosure, although some such similar assembly will ordinarily be used in the same instrument as the instant invention, the dash pot assembly shown including a plunger element 34 and the gimbal has an extension 35 which is connected to the plunger element by linkage indicated at 36. The instrument may have a mechanical output assembly which is fragmentarily indicated at 37 as connected directly to the gimbal frame 22. The gimbal frame also has an arm 38, best shown in Figure 3, which will normally carry the wiper or brush assembly of the instrument as indicated at 40.

The present invention is primarily related to the means used to transmit torque from the motor shaft 28 to the gyroscopic wheel 16. A socket 42 is provided in the end of the motor shaft 28, this socket extending axially of the shaft 28 and having wall structure wherein opposed, aligned bores 44 are provided, the axis of these bores extending transversely and diametrically of the socket 42. A hinged connecting member, illustrated as a U-shaped link 46, has its free ends 48 outturned to constitute hinge pins. These hinge pins 48 are, of course, aligned with each other and they fit loosely within the bores 44. The bight or loop portion 50 of the link 46 depends from the shaft 28 and is obviously free to pivot about the axis of the hinge pins 48. The hinge pins 48 are of a combined length slightly less than the internal diameter of the socket 42 and the link 46 is constructed of resilient material so that the free ends of the link can be pressed together to facilitate insertion of the hinge pins 48 into the bores during original assembly of the device, and this feature also, of course, facilitates disassembly of the device when necessary.

The driven member, in the illustrated instance the gyroscopic wheel 16, is provided with a slot defined by a pair of parallel pins 52. These pins 52 are terminally secured transversely of a hollow end portion 54 provided on the end of the gyroscopic wheel shaft 30 adjacent to the motor shaft 28. The hollow end portion 54 is similar to a bushing and is ordinarily press fitted into the wheel 16. Ordinarily, the hollow end portion 54 will have an internal diameter slightly greater than the diameter of the principal portion of the shaft 30 but this is not a critical relationship, the only critical dimension being that sufficient space must be provided for the parallel pins 52, these pins being considerably longer than the corresponding transverse dimension of the link 46 and these pins are spaced apart so that the bight or loop portion of the link 46 is received loosely therebetween. The end of the hollow end portion 54 may be bevelled as indicated and the said bight or loop portion 50 must, of course, be spaced from the root or inner end of the cavity in this lower end portion 54.

The sides of the slot defined by the pins 52 will preferably always be convex and this is attained by the cylindrical form of the pins 52. These pins are recti-cylindrical and of a length substantially equal to the outside diameter of a hollow end portion 54, the pins being preferably press fitted terminally into pairs of bores 56 prior to the securement of the said end portion 54 in the gyroscopic wheel 16.

The operation of this invention will be clearly understood from a consideration of the foregoing description of the mechanical details thereof, taken in connection with the drawings and the specifically set forth objects of the invention. In the light of the foregoing description, it will also now be clear that a further advantage of this coupling is that it is well adapted for high speed operation since centrifugal force, when present to a great degree, will merely tend to maintain the hinge pins in position. It will also be now abundantly clear that very considerable misalignment, due to the tilting of the driven member about axis indicated at X and Z will be accommodated without the imposition of any considerable restraint and that the coupling will continue to transmit substantially pure torque. The movement of the wheel in an axial direction is also similarly accommodated and no binding will occur.

While a preferred embodiment of this invention has been set forth in detail herein it is proposed that minor changes may be made in the invention without departure from the spirit and scope thereof. For example, while it is preferred that the pins 52 shall be constructed of nylon, since this material has been found to present apparently optimum characteristics, it is conceived that other materials might be employed. It is also conceived that the exact shaping of the pins might be varied and that the slot defined by these pins might even be accomplished in other ways than that disclosed herein. Another minor variation would be obvious to those skilled in the art and would involve the provision of the slot in the wheel itself, in such instruments as that illustrated, or in any appropriate portion of the driven member in other embodiments of this invention. It is further conceived that the socket 42 could be varied, the essential components of this portion of the structure being a pair of opposed, spaced elements on the drive shaft or other drive member. Other variations may occur to technicians skilled in this art and the present disclosure should be considered as illustrative rather than limiting.

I claim:

1. In a rotary shaft coupling device: a drive shaft having a terminal; a drive member having one end hinged on said terminal; a driven member having a slot wherein the other end of said drive member is loosely received; said terminal having diametrically opposed, spaced and aligned bores; said drive member being U-shaped with the ends turned outwardly to constitute hinge pins; and said hinge pins being journalled in said bores.

2. In a rotary shaft coupling device: a drive shaft having a terminal; a drive member having one end hinged on said terminal; a driven member having a slot wherein the other end of said drive member is loosely received; said terminal having diametrically opposed, spaced and aligned bores; said drive member being U-shaped with the ends turned outwardly to constitute hinge pins; and said hinge pins being journalled in said bores; said terminal being a socket and said drive member being resilient to facilitate insertion and removal of said hinge pins.

3. In a rotary shaft coupling device: a drive shaft having a terminal; a drive member having one end hinged on said terminal; a driven member having a slot wherein the other end of said drive member is loosely received; said driven member having a pair of parallel pins secured therein and defining said slot; said pins being of resilient material.

References Cited in the file of this patent

UNITED STATES PATENTS 2,148,975     Agren ---------------- Feb. 28, 1939